United States Patent [19]

Snodgrass

[11] Patent Number: 5,222,268
[45] Date of Patent: Jun. 29, 1993

[54] POCKET EYEGLASS CLEANER APPARATUS

[76] Inventor: George F. Snodgrass, P.O. Box 105, Rossville, Ga. 30741

[21] Appl. No.: 825,567

[22] Filed: Jan. 24, 1992

[51] Int. Cl.$^5$ .............................................. A46B 13/04
[52] U.S. Cl. ............................................. 15/29; 15/105; 15/160; 15/214; 401/10
[58] Field of Search ................ 15/214, 220.3, 160, 15/106, 29, 105; 401/10

[56] References Cited

U.S. PATENT DOCUMENTS

| | | | |
|---|---|---|---|
| 483,503 | 9/1892 | Smith | 15/220.3 |
| 816,227 | 3/1906 | Fosberg | 15/214 |
| 1,144,483 | 6/1915 | Leonard | 15/214 |
| 1,189,505 | 7/1916 | Stockton | 401/10 |
| 1,602,333 | 10/1926 | Burke | 15/214 |
| 1,905,399 | 4/1933 | Wagner | 15/160 |
| 2,908,923 | 10/1959 | Schlechter | 410/10 |
| 3,355,757 | 12/1967 | O'Searo et al. | 15/105 |
| 4,347,010 | 8/1982 | Petkoff | 410/10 |
| 5,046,212 | 9/1991 | O'Conke | 15/105 |

FOREIGN PATENT DOCUMENTS 2167946  6/1986  United Kingdom ............... 15/220.3

Primary Examiner—Edward L. Roberts
Attorney, Agent, or Firm—Hugh E. Smith

[57] ABSTRACT

A "U" shaped framework includes spaced parallel frame plates, with the frames formed of a memory retentent material to maintain the frame plates in a parallel relationship to receive an eyeglass lens member therebetween. Each frame plate includes a cooperating fibrous or brush member to effect cleaning of opposed surfaces of the eyeglass lens. A modification of the invention includes a fluid reservoir to direct a cleaning solution through a brush head onto an associated lens surface for enhancing cleaning of an eyeglass structure.

2 Claims, 4 Drawing Sheets

POCKET EYEGLASS CLEANER APPARATUS

BACKGROUND OF THE INVENTION

1. Field of the Invention

The field of invention relates to eyeglass cleaning apparatus, and more particularly pertains to a new and improved pocket eyeglass cleaner apparatus wherein the same is arranged to effect cleaning of opposed lens surfaces.

2. Description of the Prior Art

Various eyeglass lens cleaning tools arranged for convenience are available in the prior art and an example is set forth in U.S. Pat. No. 4,927,284 to Tsai wherein an elongate penlike structure includes a detergent held in the container, with a cloth mounted attachably to the pen for the cleaning of an eyeglass lens.

U.S. Pat. No. 4,796,751 to Madkour sets forth a portable eyeglass cleaning kit wherein a container includes separate elements of fluid and cleaning absorbent material for cleaning an eyeglass lens structure.

U.S. Pat. No. 4,347,010 to Petkoff sets forth an eyeglass cleaning device wherein an elongate casing includes a fluid directed through a forward reservoir, wherein the forward reservoir permits projection through a conduit into a pad member of the eyeglass structure.

As such, it may be appreciated that there continues to be a need for a new and improved pocket eyeglass cleaner apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of eyeglass cleaning apparatus now present in the prior art, the present invention provides a pocket eyeglass cleaner apparatus wherein the same is arranged to simultaneously clean opposed surfaces of an eyeglass lens. As such, the general purpose of the present invention, which will be described subsequently in greater detail, is to provide a new and improved pocket eyeglass cleaner apparatus which has all the advantages of the prior art eyeglass cleaning apparatus and none of the disadvantages.

To attain this, the present invention provides a "U" shaped framework including spaced parallel frame plates, with the frames formed of a memory retentent material to maintain the frame plates in a parallel relationship to receive an eyeglass lens member therebetween. Each frame plate includes a cooperating fibrous or brush member to effect cleaning of opposed surfaces of the eyeglass lens. A modification of the invention includes a fluid reservoir to direct a cleaning solution through a brush head onto an associated lens surface for enhancing cleaning of an eyeglass structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pocket eyeglass cleaner apparatus which has all the advantages of the prior art eyeglass cleaning apparatus and none of the disadvantages.

It is another object of the present invention to provide a new and improved pocket eyeglass cleaner apparatus which may be easily and efficiently manufactured and marketed.

It is a further object of the present invention to provide a new and improved pocket eyeglass cleaner apparatus which is of a durable and reliable construction.

An even further object of the present invention is to provide a new and improved pocket eyeglass cleaner apparatus which is susceptible of a low cost of manufacture with regard to both materials and labor, and which accordingly is then susceptible of low prices of sale to the consuming public, thereby making such pocket eyeglass cleaner apparatus economically available to the buying public.

Still yet another object of the present invention is to provide a new and improved pocket eyeglass cleaner apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
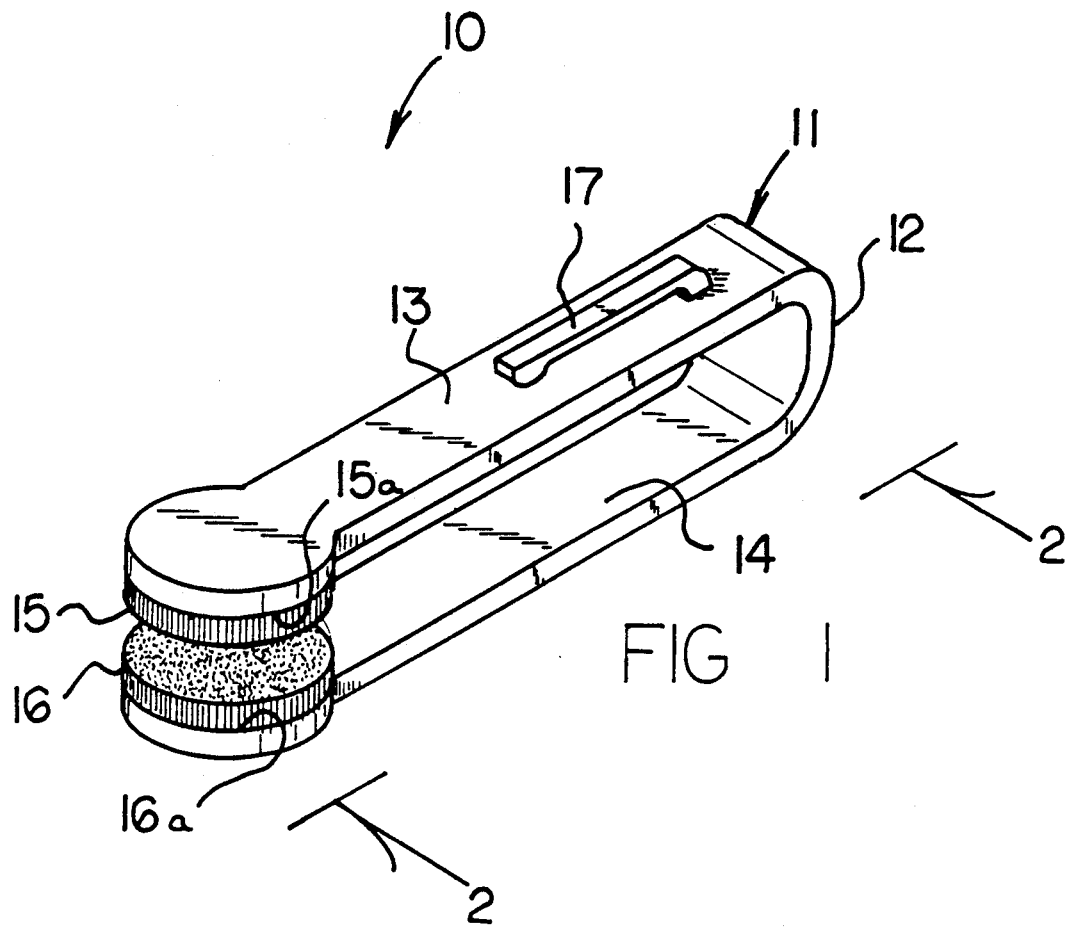
FIG. 1 is an isometric illustration of the instant invention.
Figure 2:
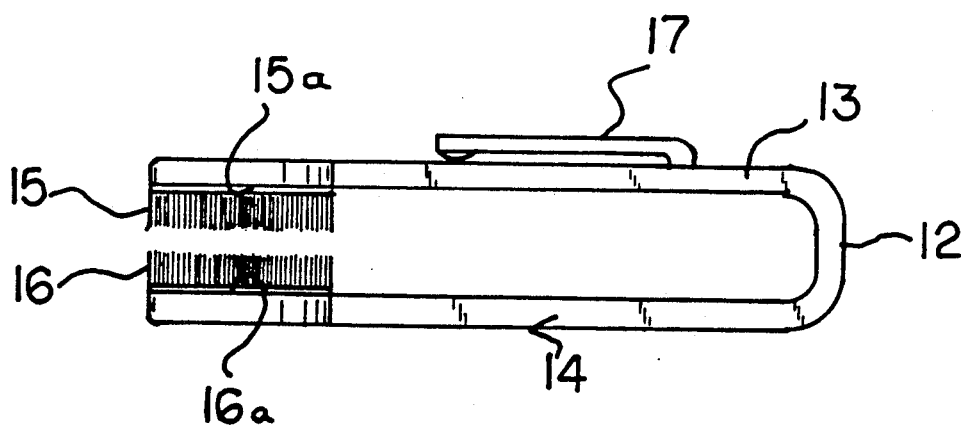
FIG. 2 is an orthographic view, taken along the lines 2—2 of FIG. 1 in the direction indicated by the arrows.

With reference now to the drawings, and in particular to FIGS. 1 to 9 thereof, a new and improved pocket eyeglass cleaner apparatus embodying the principles and concepts of the present invention and generally designated by the reference numerals 10, 10a, and 10b will be described.

Figure 3:
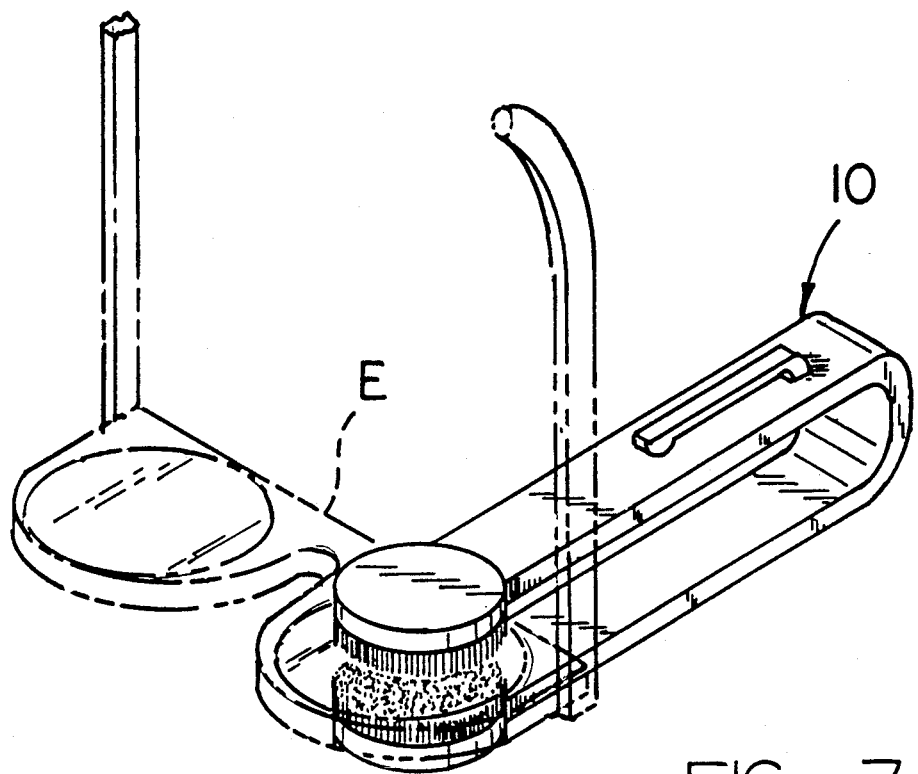
FIG. 3 is an isometric illustration of the instant invention in use.
Figure 4:
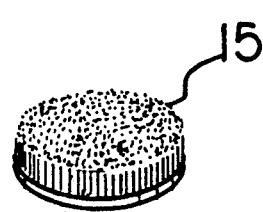
FIG. 4 is an isometric illustration of a brush head utilized by the invention.
Figure 5:
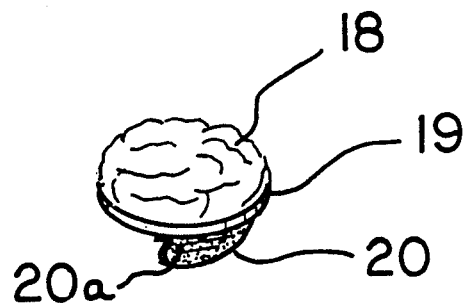
FIG. 5 is an isometric illustration of a replaceable fibrous cleaning pad utilized by the invention.

More specifically, the pocket eyeglass cleaner apparatus 10 of the instant invention essentially comprises a "U" shaped frame 11 to include a central web 12, with a first frame plate 13 and a second frame plate 14 extending forwardly of the central web 12, wherein the first and second plates 13 and 14 are arranged in a parallel coextensive relationship, and wherein the "U" shaped frame 11 is formed of a shape retentent material to effect a "spring-back" of the first and second plates 13 and 14 subsequent to use. A first brush member 15 is mounted to an interior first end surface 15a of the first plate 13, with a second brush member 16 mounted in a facing confronting relationship to the first brush member 15 and secured to a second interior end surface of the second frame plate 14. A clip leg 17 mounted to an outer surface of the first frame plate 13 is arranged in a biased relationship towards the second frame plate to permit securement of the "U" shaped frame 11 relative to a pocket and the like. The FIG. 5 illustrates the use of a replacement fibrous pad 18 formed with a pad base 19, and the base including an adhesive layer 20 exposed by a removable web 20a to permit securement of the fibrous pad 18 to one of said interior surfaces 15a or 16a to provide for the ease of a fibrous pad in combination with a brush structure in the cleaning of an eyeglass lens of an eyeglass assembly "E" in a manner as illustrated in FIG. 3.

Figure 6:
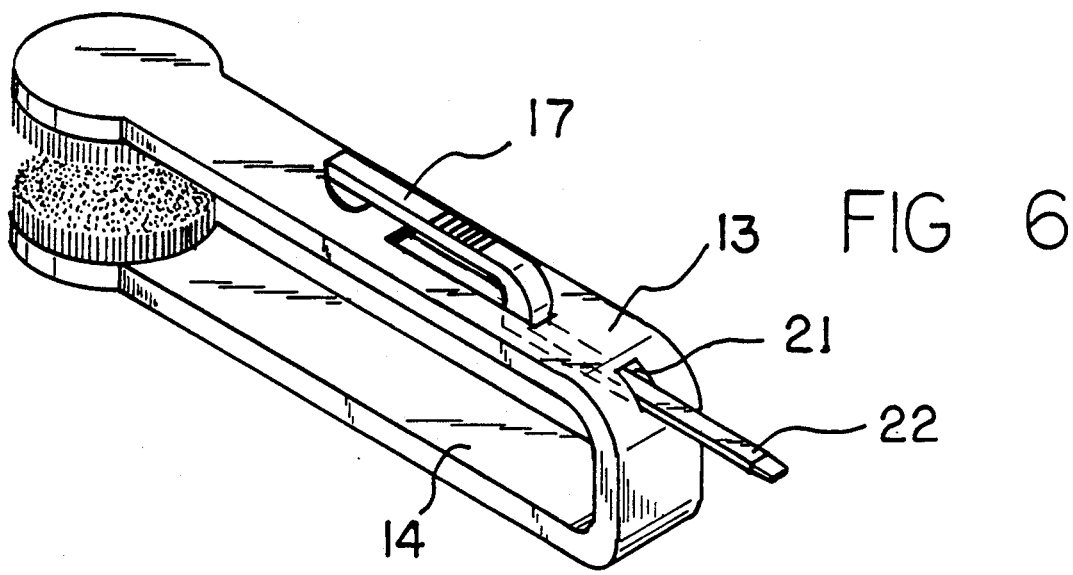
FIG. 6 is an isometric rear view of a modified framework.
Figure 7:
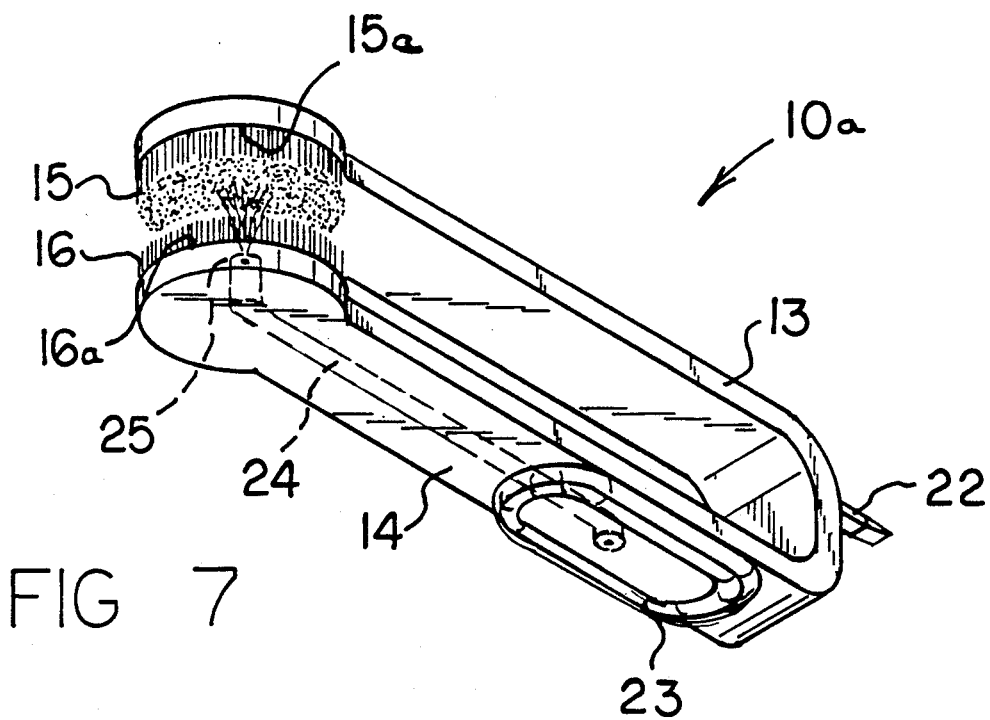
FIG. 7 is an isometric bottom illustration of the modification of the invention.

The apparatus 10a as illustrated in the FIGS. 6 and 7 further includes an addition to the structure as set forth in the FIGS. 1-5, an elongate cavity 21 directed into the first frame plate 13 adjacent the central web 12 to telescopingly receive a rigid screw driver blade 22 therewithin for use in association in the adjustment of an eyeglass structure. Further, a fluid filled reservoir pad 23 is mounted to an exterior surface of a second frame plate 14 with a reservoir conduit 24, with a first end in fluid communication with the reservoir pad 23, and an exit port 25 directed through the second interior end surface 16a into communication with the second brush member 16. Upon depressing manually of the reservoir pad 23, fluid contained therewithin is directed through the conduit 24, through the exit port 25 into the second brush member 16 for use in an eyeglass cleaning procedure.

Figure 8:
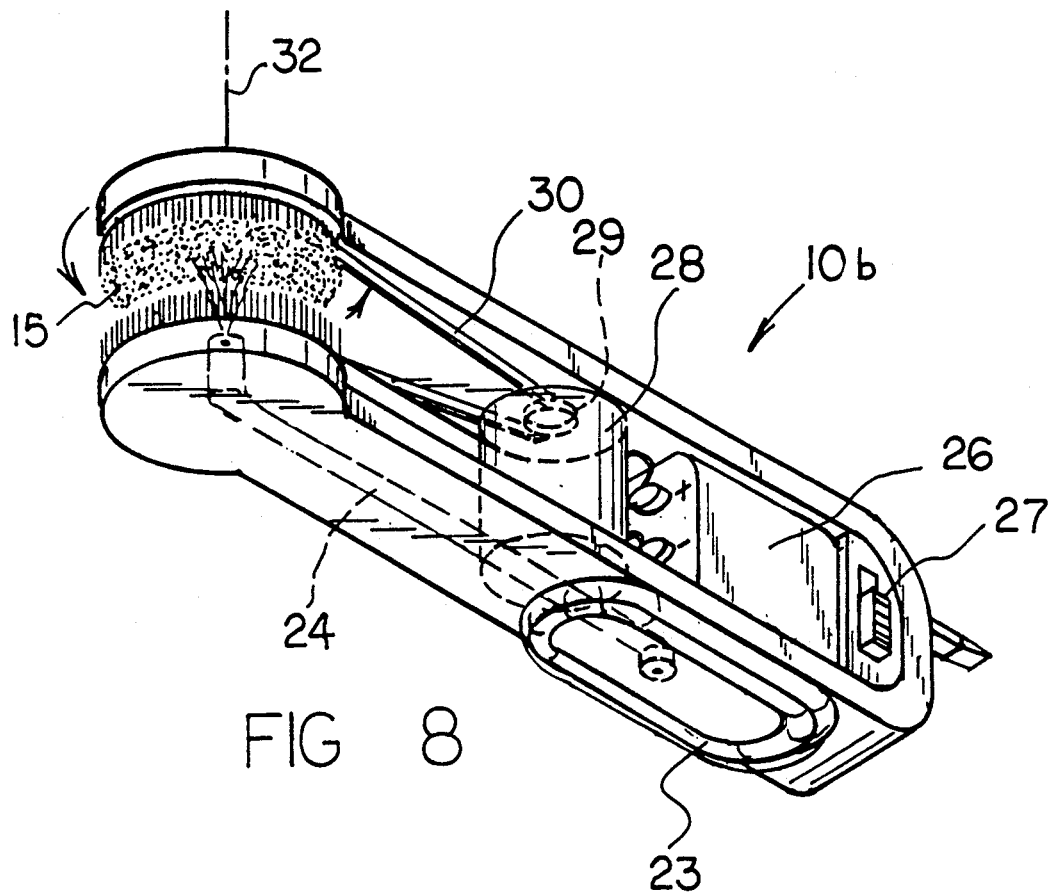
FIG. 8 is an isometric illustration of a further modification of the invention.
Figure 9:
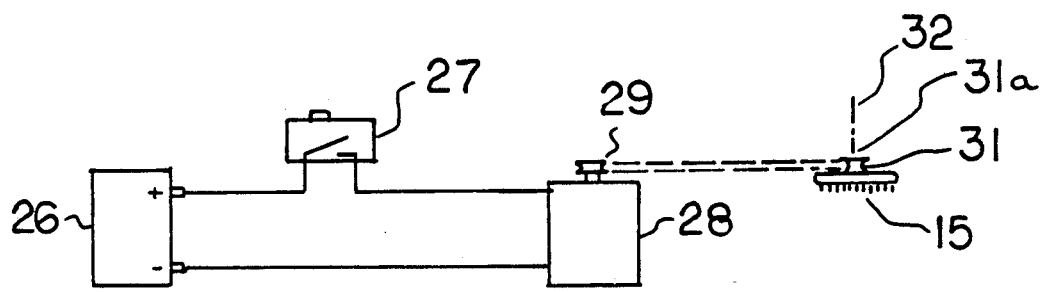
FIG. 9 is a diagrammatic electrical illustration of the drive circuitry utilized by the invention as set forth in FIG. 8.

The apparatus 10b, as illustrated in the FIG. 8 for example, includes, in addition to the aforenoted structure, a battery 26 mounted adjacent the web 11 between the first and second plates 13 and 14 in electrical communication with an on/off switch 27 and a drive motor 28 that includes a drive motor pulley 29. An endless drive belt 30 is wound about the drive motor pulley 29 and a driven pulley 31 mounted fixedly to the first brush member 15 at the drive pulley 31 is mounted to a drive pulley axle pin 31 directed into the interior first end surface 15a coaxially aligned with the first end surface axis 32 that is oriented coaxially of the first interior end surface 15a. In this manner, actuation of a drive motor 28 by means of the on/off switch 27 effects rotation of the first brush member 15 to enhance a cleaning operation of an eyeglass lens.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationship for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pocket eyeglass cleaner apparatus, comprising,
    a "U" shaped frame, the "U" shaped frame including a central web, the central web including a first frame plate and a second frame plate fixedly mounted to the central web, wherein the first frame plate and the second frame plate are arranged in a parallel coextensive relationship relative to one another, wherein the "U" shaped frame is formed of a shape retentent material to permit deflection and spring-back of the first frame plate relative to the second frame plate, with the first frame plate including a first interior end surface in a facing confronting relationship relative to a second interior end surface, with the first interior end surface including a first brush member, and the second interior end surface including a second brush member, and
    an elongate cavity extending into the first frame plate from the central web, wherein the elongate cavity includes a telescopingly mounted rigid screw driver blade contained therewithin permitting projection of the screw driver blade relative to the central web, and
    a fluid filled reservoir pad mounted to an exterior surface of the second frame plate below the second interior end surface, wherein the reservoir pad includes a reservoir conduit in fluid communication with the reservoir pad and the reservoir conduit extends through the second interior end surface into the second brush member, whereupon deflection of the reservoir pad effects projection of fluid from the reservoir pad through the reservoir conduit into the second brush member.

2. An apparatus as set forth in claim 1 including a battery mounted between the first frame plate and the second frame plate adjacent the central web, and an on/off switch mounted adjacent to the "U" shaped frame adjacent the battery, and a drive motor in electrical communication between the battery and the on/off switch, whereupon actuation of the battery effects selective actuation of the drive motor, the drive motor including a drive motor pulley, the drive motor and drive motor pulley mounted between the first frame plate and the second frame plate, and the first brush member including a driven pulley, the driven pulley rotatably mounted relative to the first interior end surface, and an endless belt mounted between the drive pulley and the driven pulley to effect selective rotation of the driven pulley and the first brush member upon actuation of the drive motor.

* * * * *